(12) United States Patent
Wang

(10) Patent No.: US 10,643,055 B2
(45) Date of Patent: May 5, 2020

(54) FINGERPRINT RECOGNITION METHOD AND SYSTEM CAPABLE OF IMPROVING FINGERPRINT RECOGNITION RATE

(71) Applicant: SHENZHEN GOODIX TECHNOLOGY CO., LTD., Shenzhen (CN)

(72) Inventor: Xinliang Wang, Shenzhen (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 231 days.

(21) Appl. No.: 15/726,326

(22) Filed: Oct. 5, 2017

(65) Prior Publication Data

US 2018/0032792 A1 Feb. 1, 2018

Related U.S. Application Data

(63) Continuation of application No. PCT/CN2016/072297, filed on Jan. 27, 2016.

(30) Foreign Application Priority Data

Dec. 11, 2015 (CN) .......................... 2015 1 0920351

(51) Int. Cl.
G06K 9/00 (2006.01)
G06K 9/03 (2006.01)

(52) U.S. Cl.
CPC ..... G06K 9/00087 (2013.01); G06K 9/00013 (2013.01); G06K 9/00993 (2013.01); G06K 9/03 (2013.01)

(58) Field of Classification Search
CPC ........... G06K 9/00087; G06K 9/00013; G06K 9/00993; G06K 9/03
See application file for complete search history.

(56) References Cited

U.S. PATENT DOCUMENTS 9,508,022 B2 * 11/2016 Russo ................. G06K 9/6202
10,068,120 B2 * 9/2018 Lyon .................... G06K 9/0002
(Continued)

FOREIGN PATENT DOCUMENTS

CN 101233529 A 7/2008
CN 102833423 A 12/2012
(Continued)

OTHER PUBLICATIONS

The Korean Examination Report of corresponding Republic of Korea application No. 10-2017-7030085, dated Jan. 22, 2019.
(Continued)

*Primary Examiner* — Gregory M Desire
(74) *Attorney, Agent, or Firm* — J.C. Patents

(57) ABSTRACT

A fingerprint recognition method capable of improving a fingerprint recognition rate includes: Step 1, collecting a fingerprint image, and recording the number of collecting times, and then proceeding to Step 2; Step 2, matching the fingerprint image with pre-stored fingerprint templates for recognition, where a current matching process for recognition ends if matching succeed, otherwise, the method proceeds to Step 3; Step 3, restoring the fingerprint image, and matching the restored fingerprint image with the pre-stored fingerprint templates for recognition, where the current matching process for recognition ends if matching succeed, otherwise, the method proceeds to Step 4; Step 4, comparing the number of collecting times with a preset number of times, where the current matching process for recognition ends if the number of collecting times reaches the preset number of times otherwise, the method returns back to Step 1.

10 Claims, 2 Drawing Sheets

(56) References Cited

U.S. PATENT DOCUMENTS

| | | | |
|---|---|---|---|
| 10,198,614 B2* | 2/2019 | Ji ....................... | G06K 9/00013 |
| 10,339,360 B2* | 7/2019 | Zhou .................. | G06K 9/00013 |
| 2003/0044052 A1* | 3/2003 | Martin ............... | G06K 9/00093 |
| | | | 382/125 |
| 2005/0129290 A1 | 6/2005 | Lo et al. ....................... | 382/124 |
| 2012/0016798 A1 | 1/2012 | Carper ........................... | 705/43 |
| 2014/0294259 A1* | 10/2014 | Lee .................... | G06K 9/00013 |
| | | | 382/124 |
| 2017/0344734 A1* | 11/2017 | Zhou ..................... | G06F 1/1692 |
| 2018/0032792 A1* | 2/2018 | Wang ................. | G06K 9/00013 |
| 2018/0225494 A1* | 8/2018 | Rhee ................. | G06K 9/00067 |
| 2018/0276451 A1* | 9/2018 | Zhou .................. | G06K 9/00006 |
| 2018/0330145 A1* | 11/2018 | Dai ........................ | G06K 9/036 |
| 2019/0205683 A1* | 7/2019 | Huang ................. | G01R 31/3163 |

FOREIGN PATENT DOCUMENTS

| | | |
|---|---|---|
| CN | 103714323 A | 4/2014 |
| JP | 08-185517 | 7/1996 |
| WO | 2005059824 A2 | 6/2005 |

OTHER PUBLICATIONS

The Chinese First Examination Report of corresponding Chinese application No. 201510920351.9, dated Apr. 1, 2019.

\* cited by examiner

FINGERPRINT RECOGNITION METHOD AND SYSTEM CAPABLE OF IMPROVING FINGERPRINT RECOGNITION RATE

CROSS-REFERENCE TO RELATED APPLICATIONS

This application is a continuation of International Application No. PCT/CN2016/072297, filed on Jan. 27, 2016, which claims priority to Chinese Patent Application No. 201510920351.9, filed on Dec. 11, 2015, both of which are hereby incorporated by reference in their entireties.

TECHNICAL FIELD

The present disclosure relates to the technical field of fingerprint recognition, and more particularly, to a fingerprint recognition method and system capable of improving a fingerprint recognition rate.

BACKGROUND

In recent years, with popularity and application of mobile terminals, such as smart phones or the like, fingerprint recognition technologies have also been rapidly developed in the field of the mobile terminals, which involve functions such as fingerprint unlock, payment and the like. However, in an actual fingerprint application scenario, when sweat or stain exists on fingers or the fingers are dry, a fingerprint recognition rate is often reduced, and thus user experience is affected. Therefore, it is increasingly urgent to improve the recognition rate of a "problematic" fingerprint.

SUMMARY

A technical problem to be solved by the present disclosure is to provide a fingerprint recognition method and system capable of improving a fingerprint recognition rate, which aims to solve a problem that an existing fingerprint recognition method has a poor recognition rate for a "problematic" fingerprint.

The present disclosure is implemented by:

a fingerprint recognition method capable of improving a fingerprint recognition rate, including the following steps:

Step 1: collecting a fingerprint image, and recording the number of collecting times, and then proceeding to Step 2;

Step 2: matching the fingerprint image with pre-stored fingerprint templates for recognition, where a current matching process for recognition ends if matching succeeds, otherwise, the method proceeds to Step 3;

Step 3: restoring the fingerprint image, and matching the restored fingerprint image with the pre-stored fingerprint templates for recognition, where the current matching process for recognition ends if matching succeed, otherwise, the method proceeds to Step 4;

Step 4: comparing the number of collecting times with a preset number of times, where the current matching process for recognition ends if the number of collecting times reaches the preset number of times; otherwise, the method returns back to Step 1.

Further, the number of the pre-stored fingerprint templates is at least one, the pre-stored fingerprint templates at least include at least one fingerprint template for a same finger; when the matching for recognition is performed, if any one of the pre-stored fingerprint templates is able to match the fingerprint image, then it is determined that the matching succeeds.

Further, the matching for recognition in Step 2 and Step 3 is based on whether the fingerprint image is matched with the pre-stored fingerprint templates according to a similarity between the fingerprint image and the fingerprint templates; and the similarity includes at least one of: the number of matched feature points and a similarity in histogram distribution.

Further, the fingerprint image is restored by restoring a damaged area of the fingerprint image according to a total variation method.

Further, it is further included between Step 2 and Step 3: recording a fingerprint template in the pre-stored fingerprint templates whose similarity with the fingerprint image is greater than a preset threshold if the collected fingerprint image is not matched with the pre-stored fingerprint templates; in Step 3, the fingerprint image is restored, and the restored fingerprint image is matched with the recorded fingerprint template for recognition, where the current matching process for recognition ends if matching succeeds, otherwise the method proceeds to Step 4.

A fingerprint recognition system capable of improving a fingerprint recognition rate, including: a fingerprint collecting module, a fingerprint matching module, a fingerprint restoring module and a fingerprint collection times comparing module;

the fingerprint collecting module is used to collect a fingerprint image, record the number of collecting times, transmit the collected fingerprint image to the fingerprint matching module, and transmit the number of collecting times to the fingerprint collection times comparing module;

the fingerprint matching module is used to match the fingerprint image with pre-stored fingerprint templates for recognition, wherein a current matching process for recognition ends if matching succeeds, otherwise the fingerprint matching module transmits the fingerprint image to the fingerprint restoring module;

the fingerprint restoring module is used to restore the fingerprint image, and transmit the restored fingerprint image to the fingerprint matching module;

the fingerprint matching module is further used to match the restored fingerprint image with the pre-stored fingerprint templates for recognition, wherein the current matching process for recognition end if matching succeeds, and otherwise the current matching process is proceeded to the fingerprint collection times comparing module;

the fingerprint collection times comparing module is used to compare the number of collecting times with a preset number of times, wherein the current matching process for recognition ends if the number of collecting times reaches the preset number of times, otherwise the current matching process is turned back to the fingerprint collecting module.

Further, the number of the pre-stored fingerprint templates is at least one, the pre-stored fingerprint templates at least include at least one fingerprint template for a same finger; the fingerprint matching module is configured to perform the matching for recognition and determine the matching succeeds if any one of the pre-stored fingerprint templates is matched with the fingerprint image.

Further, the fingerprint matching module is configured to determine whether the fingerprint image is matched with the pre-stored fingerprint templates according to a similarity between the fingerprint image and the fingerprint templates; and the similarity includes at least one of: the number of matched feature points and a similarity in histogram distribution.

Further, the fingerprint restoring module is configured to restore a damaged area of the fingerprint image according to a total variation method.

Further, the fingerprint matching module is further configured to record a fingerprint template in the pre-stored fingerprint templates whose similarity with the fingerprint image is greater than a preset threshold if the collected fingerprint image is not matched with the pre-stored fingerprint templates, and transmit the fingerprint image to the fingerprint restoring module; and the fingerprint matching module is further used to match the restored fingerprint image with the recorded fingerprint template for recognition, wherein the current matching process for recognition ends if matching succeeds, otherwise the current matching process is proceeded to the fingerprint collection times comparing module.

Compared with the prior art, the present disclosure improves a fingerprint recognition success rate by collecting fingerprint images in loops for matching and recognition, and restoring an unrecognized fingerprint image for further matching and recognition; and technical supports for timely performing operations such as fingerprint unlock, payment or the like can be provided. The present disclosure may significantly improve the fingerprint recognition success rate especially when sweat or stain exists on fingers or the fingers are dry, and expand application environment for a user to use the fingerprint recognition.

DESCRIPTION OF EMBODIMENTS

In order to make objectives, technical solutions and advantages of the present disclosure clearer, the present disclosure will be described hereunder in detail with reference to the accompanying drawings and the embodiments.

Figure 1:
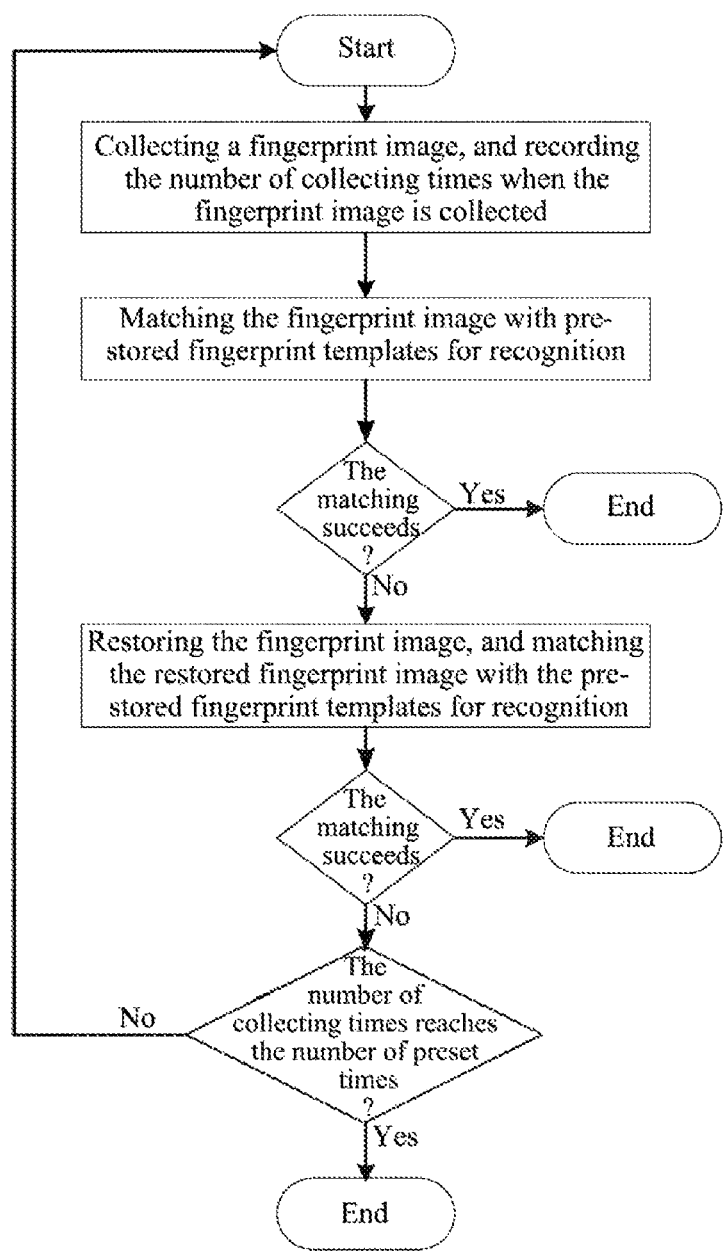
FIG. 1 is a schematic flowchart of a fingerprint recognition method capable of improving a fingerprint recognition rate according to an embodiment of the present disclosure.
Figure 2:
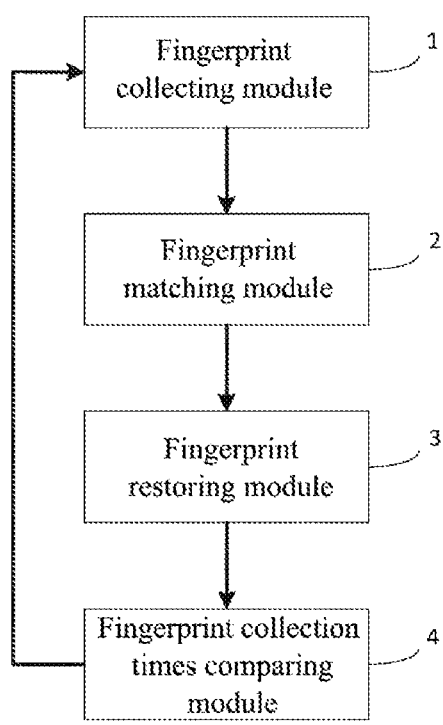
FIG. 2 is a schematic structural diagram of a fingerprint recognition system capable of improving a fingerprint recognition rate according to an embodiment of the present disclosure.

As shown in FIG. 1, a fingerprint recognition method capable of improving a fingerprint recognition rate according to an embodiment of the present disclosure includes the following steps.

Step 1: a fingerprint image is collected, and the number of collecting times is recorded, and then the method proceeds to Step 2.

Step 2: the fingerprint image is matched with pre-stored fingerprint templates for recognition; if matching succeeds, a current matching process for recognition ends; otherwise, the method proceeds to Step 3.

Before the fingerprint matching for recognition, several fingerprint templates are pre-stored. The number of the pre-stored fingerprint templates is at least one, and the pre-stored fingerprint templates at least include at least one fingerprint template for a same finger. For instance, fingerprint templates of ten fingers of the same person may be pre-stored, and as for a same finger, only one fingerprint template may be stored; alternatively, a plurality of fingerprint templates may be stored for a same finger. A recognition success rate of using a finger for fingerprint matching recognition may be improved by storing a plurality of fingerprint templates for the finger.

After a fingerprint image is collected, the collected fingerprint image may be matched with pre-stored fingerprint templates for recognition. The matching for recognition may use an existing fingerprint image recognition algorithm, to determine whether the fingerprint image matches the fingerprint templates according to a similarity between the fingerprint image and the fingerprint templates. The similarity refers to a parameter that may represent a degree of similarity between images, and includes at least one of: the number of matched feature points and a similarity in histogram distribution, but similarity is not limited to the number of matched feature points and the similarity in histogram distribution. For instance, a threshold for the number of matched feature points and a threshold for the similarity in histogram distribution may be set, if the number of matched feature points and/or the similarity in histogram distribution between the collected fingerprint image and the fingerprint templates does not reach corresponding thresholds, it may be determined that the fingerprint image does not match the fingerprint templates.

Step 3: the fingerprint image is restored, and then the restored fingerprint image is matched with the pre-stored fingerprint templates for recognition; if matching succeeds, a current matching process for recognition ends; otherwise, the method proceeds to Step 4.

If the collected fingerprint image fails to be matched with the pre-stored fingerprint templates for recognition, a reason may be that the collected fingerprint image is damaged due to some special cases such as sweat, stain or dust existing on fingers or the fingers being dry. Therefore, when the fingerprint image fails to be matched with the pre-stored fingerprint templates, the fingerprint image may be restored, and after that, the restored fingerprint image may further be matched with the pre-stored fingerprint templates for recognition. The restoration of the fingerprint image may use an existing image restoration processing algorithm, such as restoring a damaged area of the fingerprint image according to a total variation method so as to recover the fingerprint image at an utmost degree.

As a preferred embodiment of the present disclosure, a step is further included between Step 2 and Step 3, the step is that: if the collected fingerprint image is not matched with the pre-stored fingerprint templates, a fingerprint template in the pre-stored fingerprint templates, whose similarity with the collected fingerprint image is greater than a preset threshold, is recorded; the preset threshold is less than a similarity value. In addition, in Step 3, the restored fingerprint image is matched with the recorded fingerprint template for recognition; if matching succeeds, the current matching process for recognition ends; otherwise, the method proceeds to Step 4. This may not only improve a recognition rate of a partially-damaged fingerprint image, but also decrease a probability that an illegal fingerprint would become a legal fingerprint after several restorations.

Step 4: the number of collecting times is compared with a preset number of times; if the number of collecting times reaches the preset number of times, the current matching process for recognition ends; otherwise, the method returns back to Step 1.

During collection of the fingerprint image, it is necessary to record the number of collecting times, that is, to record the current number of collecting times for collecting the fingerprint image. If the fingerprint image still fails to be matched with the pre-stored fingerprint templates after being restored, it is necessary to determine whether the current number of collecting times reaches the preset number of times. If the current number of collecting times reaches the preset number of times, it may be determined that the matching between the fingerprint image and the pre-stored fingerprint templates fails, and the fingerprint matching process may end. If the current number of collecting times does not reach the preset number of times, the method returns back to Step 1 to collect the fingerprint image again and perform the fingerprint matching process for recognition as described previously. That is, Step 1 to Step 4 are executed in loops till the fingerprint image is matched successfully or the number of collecting times reaches the preset number of times.

This method may be applied in a fingerprint sensor of a mobile terminal. The present disclosure improves a fingerprint recognition rate by collecting fingerprint images in loops for matching and recognition, and restoring an unrecognized fingerprint image for further matching and recognition; and technical supports for timely performing operations such as fingerprint unlock, payment or the like can be provided. In a case that sweat or stain exists on fingers or the fingers are dry, a user does not need to worry about being unable to timely perform the fingerprint unlock, payment or the like due to a low fingerprint recognition rate. Application experience of the user are improved in fingerprint unlock, payment or the like on the mobile terminal, and the application environment for the user to use fingerprint recognition is expanded. For instance, the fingerprint recognition may be used under environment where it is humid or dusty or the weather is dry. In the current market, many products in the mobile terminals such as smart phones, PADs, IPADs, laptops or the like have had fingerprint sensors, for these products equipped with the fingerprint sensors, the present disclosure may be applied in these mobile terminals without increasing additional costs.

Based on the above method, the present disclosure further provides a fingerprint recognition system capable of improving a fingerprint recognition rate. The fingerprint recognition system includes a fingerprint collecting module 1, a fingerprint matching module 2, a fingerprint restoring module 3 and a fingerprint collection times comparing module 4.

The fingerprint collecting module 1 is used to collect a fingerprint image, record the number of collecting times, transmit the collected fingerprint image to the fingerprint matching module 2, and transmit the number of collecting times to the fingerprint collection times comparing module 4.

The fingerprint matching module 2 is used to match the fingerprint image with pre-stored fingerprint templates for recognition; a current matching process for recognition end if matching succeeds, otherwise the fingerprint matching module 2 transmits the fingerprint image to the fingerprint restoring module 3.

In the present embodiment, the fingerprint matching module 2 may determine whether the fingerprint image matches the fingerprint templates according to a similarity between the fingerprint image and the fingerprint templates. A determination basis of the similarity includes at least one of: the number of matched feature points and a similarity in histogram distribution.

The number of pre-stored fingerprint templates is at least one. The pre-stored fingerprint templates at least include at least one fingerprint template for a same finger. When the fingerprint matching module 2 performs the matching for recognition, if any one of the pre-stored fingerprint templates matches the fingerprint image, it is determined that the matching succeeds.

The fingerprint restoring module 3 is used to restore the fingerprint image, and transmit the restored fingerprint image to the fingerprint matching module 2. The fingerprint restoring module 3 may restore a damaged area of the fingerprint image according to a total variation method so as to recover the fingerprint image at an utmost degree.

The fingerprint matching module 2 is further used to match the restored fingerprint image with the fingerprint templates for recognition; the current matching process for recognition ends if matching succeed, otherwise the current matching process is proceeded to the fingerprint collection times comparing module 4.

As a preferred embodiment of the present disclosure, the fingerprint matching module 2 is further used to record a fingerprint template whose similarity with the fingerprint image in the pre-stored fingerprint templates is greater than a preset threshold if the collected fingerprint image is not matched with the pre-stored fingerprint templates, and transmit the fingerprint image to the fingerprint restoring module 3; the preset threshold is less than a value of the similarity. After the fingerprint restoring module 3 restores the fingerprint image, the fingerprint matching module 2 is further used to match the restored fingerprint image with the recorded fingerprint template for recognition; the current matching process for recognition ends if the matching succeed, otherwise the current matching process for recognition is proceeded to the fingerprint collection times comparing module 4. This may not only improve a recognition rate of a partially-damaged fingerprint image, but also decrease a probability that an illegal fingerprint would become a legal fingerprint during several restorations.

The fingerprint collection times comparing module 4 is used to compare the number of collecting times with a preset number of times; the current matching process for recognition ends if the number of collecting times reaches the preset number of times, otherwise the current matching process is returned back to the fingerprint collecting module 1.

The system may be applied in a fingerprint sensor of a mobile terminal, which improves a fingerprint recognition success rate by collecting fingerprint images in loops for matching and recognition, and restoring an unrecognized fingerprint image for further matching and recognition; and technical supports for timely performing operations such as fingerprint unlock, payment or the like can be provided. In a case that sweat or stain exists on fingers or the fingers are dry, a user does not need to worry about being unable to timely perform the fingerprint unlock, payment or the like due to a low fingerprint recognition rate. Application experience of the user are improved in fingerprint unlock, payment or the like on the mobile terminal, and the application environment for the user to use fingerprint recognition is expanded. For instance, the fingerprint recognition may be used under environment where it is humid or dusty or the weather is dry. In the current market, many products in the mobile terminals such as smart phones, PADs, IPADs, laptops or the like have had fingerprint sensors, for these products equipped with the fingerprint sensors, the present disclosure may be applied in these mobile terminals without increasing additional costs.

Reference may be made to corresponding process in the above method for detailed working principles of function modules of the system, and will not be repeated here.

The foregoing description is merely preferred embodiments of the present disclosure, and is not intended to limit the present disclosure. Any modification, equivalent substitution and improvements made within spirit and principles of the present disclosure should fall into the protection scope of the present disclosure.

What is claimed is:

1. A fingerprint recognition method capable of improving a fingerprint recognition rate, comprising the following steps:
   Step 1: collecting a fingerprint image, recording the number of collecting times, and then proceeding to Step 2;
   Step 2: matching the fingerprint image with pre-stored fingerprint templates for recognition, wherein if the matching succeeds, then a current matching process for recognition ends; otherwise, proceeds to Step 3;
   Step 3: restoring the fingerprint image, and matching the restored fingerprint image with the pre-stored fingerprint templates for recognition, wherein if the matching succeeds, then a current matching process for recognition ends; otherwise, proceeds to Step 4; and
   Step 4: comparing the number of collecting times with the number of preset times, wherein if the number of collecting times reaches the number of preset times, then the current matching process for recognition ends; otherwise, returns back to Step 1.

2. The fingerprint recognition method capable of improving the fingerprint recognition rate according to claim 1, wherein the number of the pre-stored fingerprint templates is at least one, the pre-stored fingerprint templates at least comprise at least one fingerprint template for a same finger; when the matching for recognition is performed, if any one of the pre-stored fingerprint templates is able to match the fingerprint image, then it is determined that the matching succeeds.

3. The fingerprint recognition method capable of improving the fingerprint recognition rate according to claim 1, the matching for recognition in Step 2 and Step 3 is based on whether the fingerprint image matches the pre-stored fingerprint templates according to a similarity between the fingerprint image and the fingerprint templates; and
   the similarity comprises at least one of: the number of feature points matched and a similarity in histogram distribution.

4. The fingerprint recognition method capable of improving the fingerprint recognition rate according to claim 1, wherein the restoring the fingerprint image is specifically: restoring a damaged area of the fingerprint image according to a total variation method.

5. The fingerprint recognition method capable of improving the fingerprint recognition rate according to claim 1, further comprising between Step 2 and Step 3: recording a fingerprint template whose similarity with the fingerprint image in the pre-stored fingerprint templates is greater than a preset threshold if the matching does not succeed;
   Step 3 is specifically: restoring the fingerprint image, and matching the restored fingerprint image with the recorded fingerprint template for recognition, wherein if the matching succeeds, then the current matching process for recognition ends; otherwise, proceeds to Step 4.

6. A fingerprint recognition device capable of improving the fingerprint recognition rate, comprising:
   a processor; and
   a computer-readable medium for storing program codes, which, when executed by the processor, cause the processor to perform the following steps:
   Step 1: collecting a fingerprint image, recording the number of collecting times, and then proceeding to Step 2;
   Step 2: matching the fingerprint image with pre-stored fingerprint templates for recognition, wherein if the matching succeeds, then a current matching process for recognition ends; otherwise, proceeds to Step 3;
   Step 3: restoring the fingerprint image, and matching the restored fingerprint image with the pre-stored fingerprint templates for recognition, wherein if the matching succeeds, then a current matching process for recognition ends; otherwise, proceeds to Step 4; and
   Step 4: comparing the number of collecting times with the number of preset times, wherein if the number of collecting times reaches the number of preset times, then the current matching process for recognition ends; otherwise, returns back to Step 1.

7. The fingerprint recognition device capable of improving the fingerprint recognition rate according to claim 6, wherein the number of the pre-stored fingerprint templates is at least one, the pre-stored fingerprint templates at least comprise at least one fingerprint template for a same finger; when the matching for recognition is performed, if any one of the pre-stored fingerprint templates is able to match the fingerprint image, then it is determined that the matching succeeds.

8. The fingerprint recognition device capable of improving the fingerprint recognition rate according to claim 6, the matching for recognition in Step 2 and Step 3 is based on whether the fingerprint image matches the pre-stored fingerprint templates according to a similarity between the fingerprint image and the fingerprint templates; and
   the similarity comprises at least one of: the number of feature points matched and a similarity in histogram distribution.

9. The fingerprint recognition device capable of improving the fingerprint recognition rate according to claim 6, wherein the restoring the fingerprint image is specifically: restoring a damaged area of the fingerprint image according to a total variation method.

10. The fingerprint recognition device capable of improving the fingerprint recognition rate according to claim 6, further comprising between Step 2 and Step 3: recording a fingerprint template whose similarity with the fingerprint image in the pre-stored fingerprint templates is greater than a preset threshold if the matching does not succeed;
   Step 3 is specifically: restoring the fingerprint image, and matching the restored fingerprint image with the recorded fingerprint template for recognition, wherein if the matching succeeds, then the current matching process for recognition ends; otherwise, proceeds to Step 4.

* * * * *